United States Patent
Fo et al.

(10) Patent No.: US 7,472,979 B2
(45) Date of Patent: *Jan. 6, 2009

(54) OPTICAL ENCODER DEVICE, AND SYSTEM INCLUDING SAME

(75) Inventors: Kok Hing Fo, Penang (MY); Kee Yean Ng, Penang (MY); Chee Keong Chong, Penang (MY); Kean Loo Keh, Penang (MY); Herbert W. Loesch, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 530 days.

This patent is subject to a terminal disclaimer.

(21) Appl. No.: 11/188,540

(22) Filed: Jul. 25, 2005

(65) Prior Publication Data

US 2005/0253891 A1 Nov. 17, 2005

Related U.S. Application Data

(63) Continuation of application No. 10/467,614, filed as application No. PCT/US02/40276 on Dec. 16, 2002, now Pat. No. 6,966,623.

(30) Foreign Application Priority Data

Dec. 20, 2001 (ML) ............................. P1200015778

(51) Int. Cl.
*B41J 29/393* (2006.01)

(52) U.S. Cl. ........................................................ 347/19

(58) Field of Classification Search .................... 347/19, 347/235, 248, 257; 250/231.13–231.18, 250/232–236, 239; 206/711; 345/165, 166
See application file for complete search history.

(56) References Cited

U.S. PATENT DOCUMENTS

| | | | |
|---|---|---|---|
| 4,794,250 A | 12/1988 | Togami | |
| 4,983,826 A | 1/1991 | Hayase et al. | |
| 5,699,083 A | 12/1997 | Lo | |
| 5,701,525 A | 12/1997 | Caterino et al. | |
| 5,708,496 A | 1/1998 | Barnett et al. | |
| 6,520,338 B2 * | 2/2003 | Bores et al. ................. | 206/711 |
| 6,624,407 B1 * | 9/2003 | Aboonasry et al. ..... | 250/231.14 |
| 6,743,048 B1 | 6/2004 | Sauter | |
| 6,966,623 B2 * | 11/2005 | Fo et al. ....................... | 347/19 |
| 2004/0113057 A1 | 6/2004 | Fo et al. | |

FOREIGN PATENT DOCUMENTS

| | | |
|---|---|---|
| DE | 4244680 | 11/1993 |
| JP | 63168511 | 7/1988 |
| JP | 9079866 | 3/1997 |
| JP | 10239103 | 9/1998 |

OTHER PUBLICATIONS

Patents Act 1977, Combined Seach and Examination Report Under Sections 17 & 18(3) issued Aug. 15, 2005 for Great Britian Patent Application No. GB0513908.4; 4 pgs.

* cited by examiner

Primary Examiner—Hai C Pham

(57) ABSTRACT

In one embodiment, an optical encoder device is provided with an optical encoder to detect codewheel/codestrip positions; a housing to accommodate the optical encoder; a first tapered guidepost protruding from a sidewall of the optical encoder housing; and a second tapered guidepost protruding from the sidewall of the optical encoder housing and extending substantially parallel to the first tapered guidepost. Other embodiments are also disclosed.

19 Claims, 6 Drawing Sheets

OPTICAL ENCODER DEVICE, AND SYSTEM INCLUDING SAME

CROSS-REFERENCE TO RELATED APPLICATIONS

This is a continuation of application Ser. No. 10/467,614 filed on Aug. 6, 2003 now U.S. Pat. No. 6,966,623 and published on Jun. 17, 2004 as document 20040113057 A1. The entire disclosure of application Ser. No. 10/467,614 is incorporated into this application by reference. Application Ser. No. 10/467,614 is a National Stage application under 35 USC 371 of international patent application PCT/US02/40276 filed Dec. 16, 2002, which claims priority to Malaysia patent application P1200015778 filed Dec. 20, 2001.

BACKGROUND

An encoder enables a signal interpretation such as to obtain information on a position, a velocity, acceleration and/or the like when the encoder works in pair with a codewheel or a codestrip. Codewheels are generally used for detecting the rotation motion, for example of the paper feeder drum in a printer or a copy machine, while codestrips are used for detecting the linear motion, for example of the print head of the printer.

Usually, the motion of the codewheel or the codestrip is detected optically by means of an optical emitter and an optical detector. Therefore, the encoder is usually an optical encoder. The optical emitter emits light in a light emission direction towards the codewheel/codestrip. The codewheel/codestrip includes a regular pattern of slots and bars. According to the position of the slots and bars, relative to the light emission direction, the codewheel/codestrip sometimes permits and sometimes prevents light passing through. The optical detector is positioned behind the codewheel/codestrip, when seen in the direction of the light emission by the optical emitter, and detects a light signal, based on the light emitted by the optical emitter and transmitted through the codewheel/codestrip. Said detected light signal is either quadrature and/or sinusoidal and the frequency of said light signal yields unambiguous information on the motion of the codewheel/codestrip.

Due to the special arrangement of the optical emitter and the optical detector of such an optical encoder, the optical encoder housing for accommodating the optical encoder is generally C-shaped. The optical encoder together with the C-shaped optical encoder housing form a C-shaped optical encoder device. The codewheel/codestrip is passed through the free space of the C-shaped optical encoder device and moves such that the optical encoder can detect the slots and bars inside the codewheel/codestrip. FIG. 2A and FIG. 2C show cross-sections and FIG. 2B and FIG. 2D show top views of such a C-shaped optical encoder device 201 together with a codewheel 202 or a codestrip 203, respectively. The codewheel 202 and the codestrip 203 are provided with a regular pattern of slots 204 which are arranged such that a motion of the codewheel 202 or the codestrip 203, respectively, is unambiguously detectable. Therefore, the codewheel 202 or the codestrip 203, respectively, is passed through the free space 205 of the C-shaped optical encoder device 201 which takes up the codewheel 202 or the codestrip 203, respectively. If the codewheel 202 is rotated around the center C in a direction indicated by the arrows 206, respectively if the codestrip 203 is linearly moved in a direction indicated by the arrows 207, the slots 204 cause an alternating light signal in the optical detector of the optical encoder which results in an unambiguous information on the motion of the codewheel 202 or the codestrip 203, respectively.

Generally, the C-shaped optical encoder device is mounted on a printed circuit board (PCB) which is positioned inside the appliance, e.g. a printer or a copy machine, and which is used for an electrical coupling of the optical encoder to the control unit of the appliance. However, to ensure an accurate signal feedback it is important to maintain an accurate, reliable and firm position of the C-shaped optical encoder device relative to the PCB with minimum mounting tolerance. To ensure an accurate position of the C-shaped optical encoder device relative to the PCB horizontal or rotational displacements of the C-shaped optical encoder device have to be avoided.

According to the prior art, positioning is achieved by means of auxiliary devices comprising a pair of rounded guideposts which are located underneath the C-shaped optical encoder device. FIG. 3A shows in a bottom view of the C-shaped optical encoder device 201 the pair of rounded guideposts 301. As an example the C-shaped optical encoder device 201 is shown in FIG. 3A with a codestrip 203, but the positioning is also suitable for a codewheel 202. The pair of rounded guideposts 301 is part of the C-shaped optical encoder device 201 and is formed on that sidewall of the C-shaped optical encoder device 201 which is in contact with the PCB. The PCB is provided with matching holes 302 for taking up the pair of rounded guideposts 301. FIG. 3B shows a side view of the C-shaped optical encoder device 201 together with the pair of rounded guideposts 301 as well as contact pins 303 for electrically coupling the optical encoder to the control circuit of the appliance. FIG. 3C shows a footprint of the matching holes 302 as well as of the contacting holes 304 for taking up the pair of rounded guideposts 301 as well as the contact pins 303 of the C-shaped optical encoder device 201. According to the described positioning system, there results a tolerance between matching parts with a maximum of typically 0.1 mm. However, this is not sufficient for the user of today regarding the accuracy in printing devices.

After positioning the C-shaped optical encoder device on the PCB, the C-shaped optical encoder device must remain permanently attached to the PCB. This is usually done via one of the following three possibilities: using hot-riveted studs, using screws, and/or using snap catch devices. FIG. 4A to FIG. 4C show cross-sections of these three possible permanent attachments. All three figures show cross-sections of the C-shaped optical encoder device 201 as well as of the PCB. In FIG. 4A, the C-shaped optical encoder device 201 has a mounting stud 401 which is inserted in and projected through a hole in the PCB. The projecting part of the mounting stud 401 was hot-riveted such that the mounting stud 401 ends in a button like manner which has a larger diameter than the hole in the PCB. In FIG. 4B, the C-shaped optical encoder device 201 comprises housing brackets 402. Head screws 403 are passed through the housing brackets 402 as well as through corresponding holes in the PCB and are fixed by nuts 404 on the opposite side of the PCB with respect to the C-shaped optical encoder device 201. In FIG. 4C, the C-shaped optical encoder device 201 comprises snap catch devices 405 which are passed through suitable holes in the PCB. However, these possible permanent attachments have disadvantages in that they involve large-scale processing methods and/or additional housing material.

SUMMARY OF THE INVENTION

In one embodiment, an optical encoder device comprises an optical encoder to detect codewheel/codestrip positions; a housing to accommodate the optical encoder; a first tapered guidepost protruding from a sidewall of the optical encoder housing; and a second tapered guidepost protruding from the sidewall of the optical encoder housing and extending substantially parallel to the first tapered guidepost.

In another embodiment, a system comprises a printed circuit board having first and second holes therein, and an optical encoder device. The optical encoder device comprises an optical encoder to detect codewheel/codestrip positions; a housing to accommodate the optical encoder; a first tapered guidepost protruding from a sidewall of the optical encoder housing; and a second tapered guidepost protruding from the sidewall of the optical encoder housing and extending substantially parallel to the first tapered guidepost. The first and second tapered guideposts of the optical encoder device are aligned with and inserted in the first and second holes of the printed circuit board.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
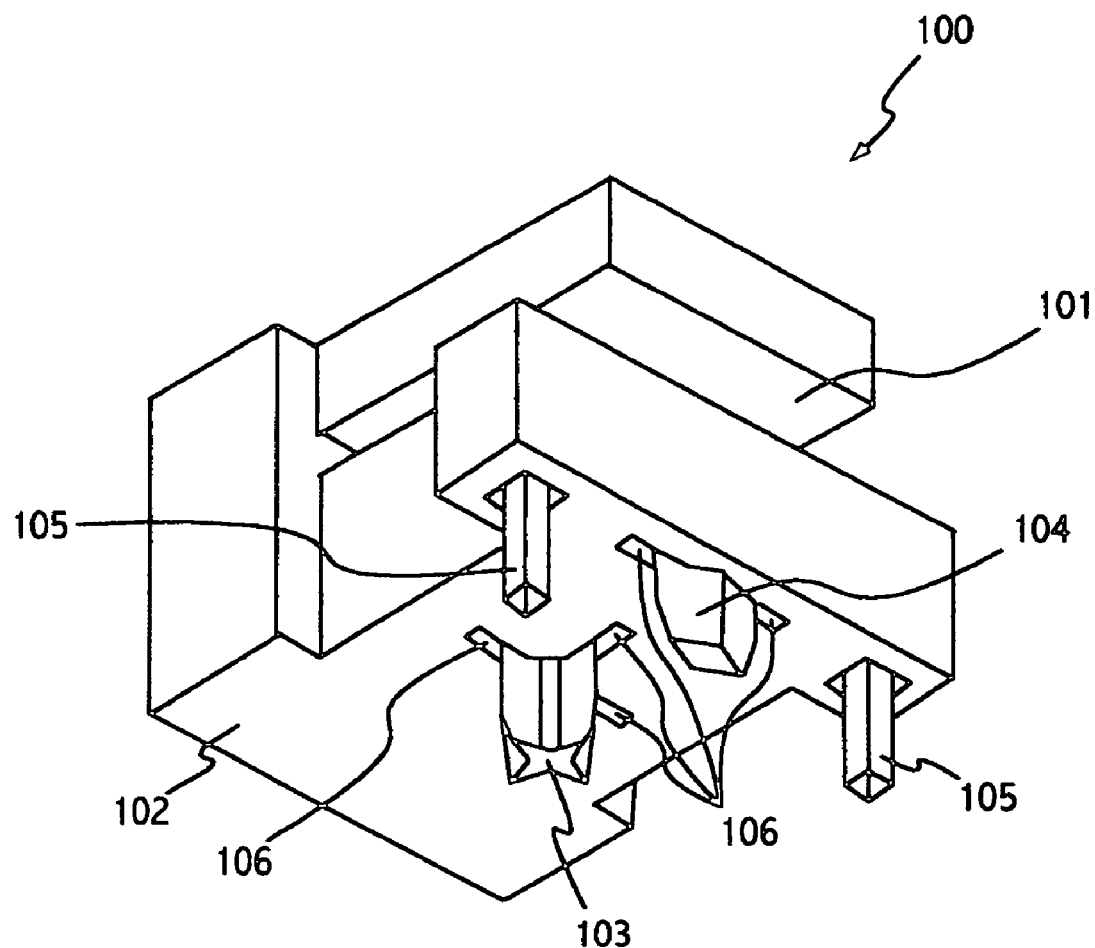
FIG. 1 shows a perspective view of an optical encoder device according to a preferred embodiment of the present invention.
Figures 2A, 2B:
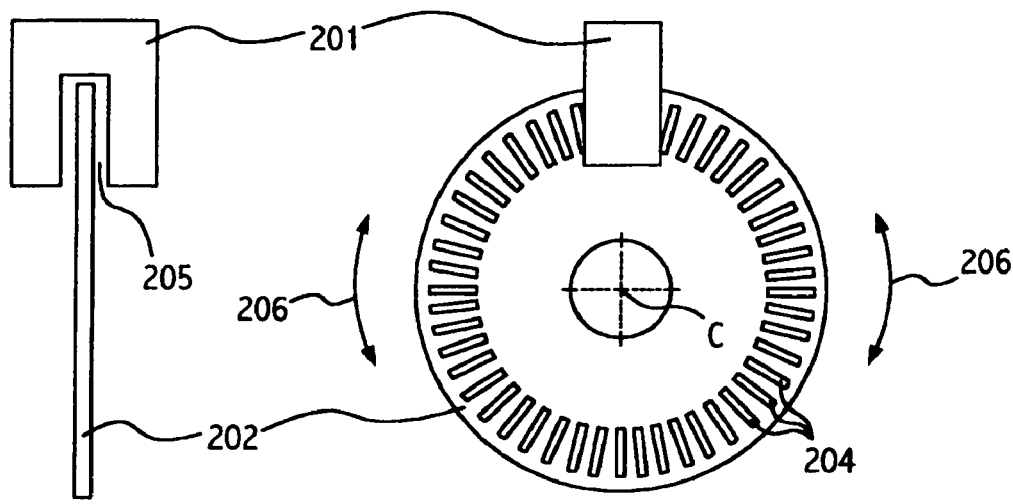
FIGS. 2A and 2C show cross-sections of a schematic optical encoder device.
FIGS. 2B and 2D show top views of a schematic optical encoder device.
Figures 2C, 2D:
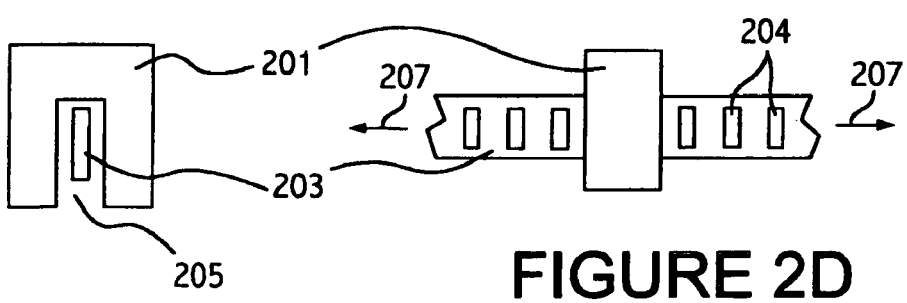
Figure 3A:
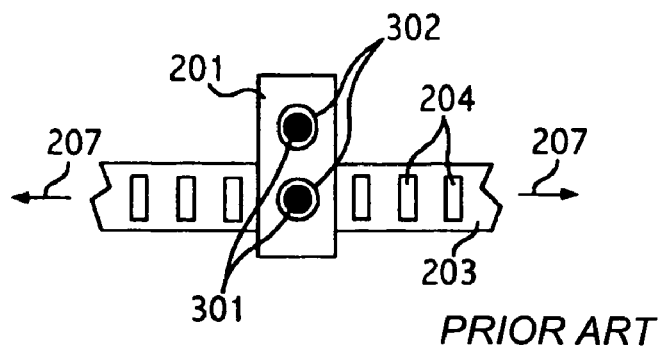
FIG. 3A shows a bottom view of an optical encoder device according to the prior art.
Figure 3B:
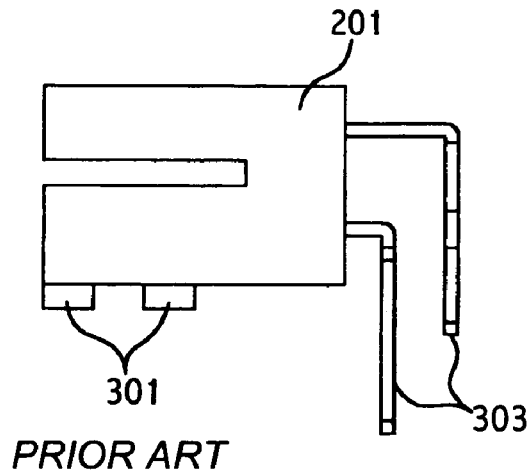
FIG. 3B shows a side view of the optical encoder device according to the prior art.
Figure 3C:
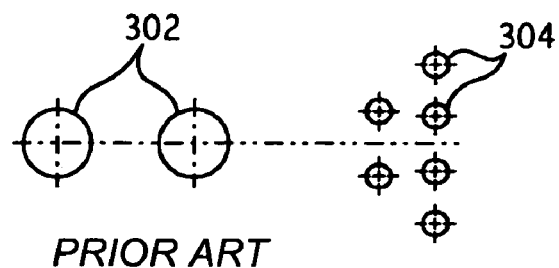
FIG. 3C shows a footprint of guideposts and connecting pins on a printed circuit board for taking up the optical encoder device according to the prior art.
Figure 4A:
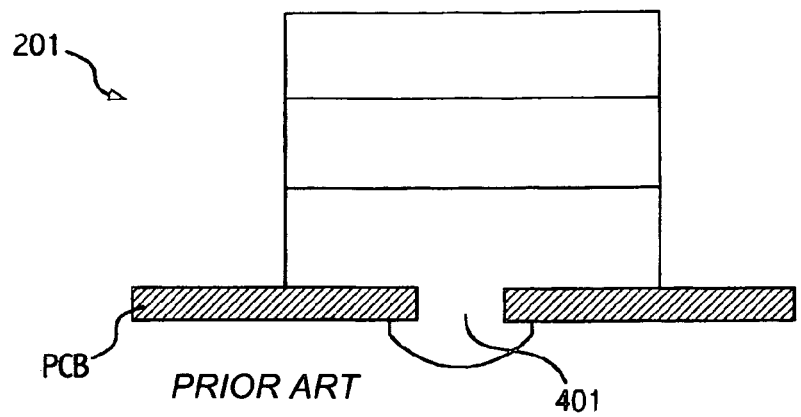
FIGS. 4A to 4C show cross-sections of different possible attachments of the optical encoder device according to the prior art.
Figure 4B:
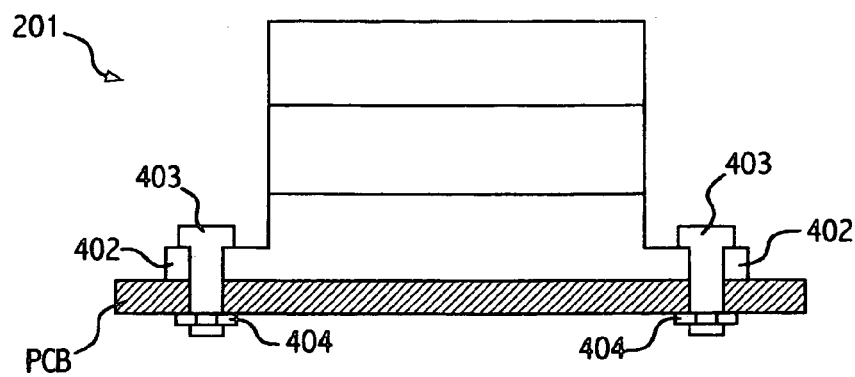
Figure 4C:
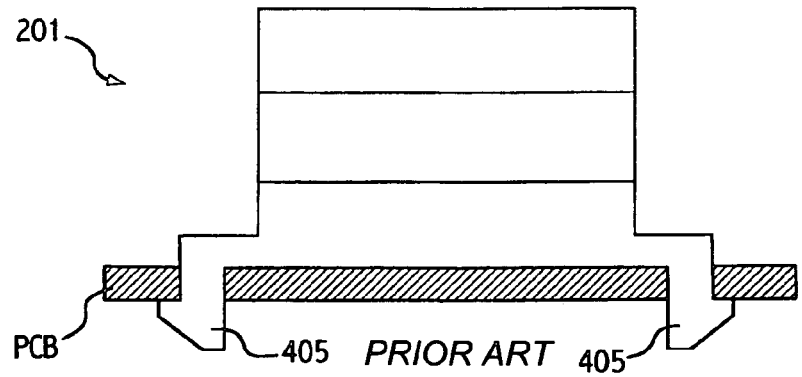

In accordance with one embodiment of the present invention, an optical encoder device includes an optical encoder for detecting codewheel/codestrip positions, an optical encoder housing for accommodating the optical encoder, a first tapered guidepost protruding from a sidewall of the optical encoder housing, and a second tapered guidepost protruding from the sidewall of the optical encoder housing and extending substantially parallel to the first guidepost. The first guidepost has a star-shaped cross-section and is arranged adjacent to the optical encoder. The second guidepost has a diamond-shaped cross-section and is arranged remote from the optical encoder. The first guidepost of the optical encoder housing is arranged at the optical center of the optical encoder device. The second guidepost is arranged at an end portion of the optical encoder housing. Then, connecting pins of the optical encoder are preferably arranged at an opposite end portion of the optical encoder housing.

The optical encoder device further includes at least one soldering pin protruding from the sidewall of the optical encoder housing and extending substantially parallel to the first guidepost, wherein the at least one soldering pin is electrically insulated against the optical encoder. It is preferable that the at least one soldering pin is arranged at a lateral distance from the second guidepost.

At least one channel is formed in the sidewall of the optical encoder housing at the periphery of at least one of the first and second guideposts. The channel extends preferably from a corner of the cross-section of the corresponding guidepost. A first tapered guidepost and a second tapered guidepost are included in the optical encoder device. The first tapered guidepost protrudes from the sidewall of the optical encoder housing and extends substantially parallel to the at least one soldering pin. The first guidepost has a star-shaped cross-section and is arranged adjacent to the optical encoder. The second tapered guidepost protrudes from the sidewall of the optical encoder housing and extends substantially parallel to the at least one soldering pin. The second guidepost has a diamond-shaped cross-section and is arranged remote from the optical encoder.

One advantage of the present invention is that the optical encoder device enables a self-alignment during positioning of the optical encoder device due to the special design of the guideposts. Another advantage of the present invention is that after positioning the optical encoder device a lateral or rotational movement can be avoided. A further advantage of the present invention is that by means of the at least one soldering pin the permanent attachment of the optical encoder device can be easily carried out during the normal soldering process in cases where the electrical connections between the connecting pins of the optical encoder and the control circuit of the appliance are provided. Therefore, no separate process for permanently attaching the optical encoder device to the PCB is necessary. This saves both time and costs for producing the optical encoder device. The optical encoder device according to embodiments of the present invention will be described in more detail below, also in conjunction with FIGS. 1 and 5A-5D.

FIG. 1 shows a perspective view of an optical encoder device 100 according to a preferred embodiment of the present invention.

The optical encoder device 100 is substantially C-shaped and comprises a free space 101 for receiving a codewheel or a codestrip. In the center position on the bottom sidewall 102, which faces the printed circuit board (PCB) on which the optical encoder device 100 is to be installed, there protrudes a first guidepost 103 from the sidewall 102. The first guidepost 103 has a star-shaped cross-section parallel to the sidewall 102 and is tapered towards its free end. Inside the optical encoder device 100, directly above and adjacent to the first guidepost 103 and facing towards the free space 101, there is provided an optical detector (not shown) of the optical encoder device 100 which is aligned with an optical emitter (not shown) at the opposite side of the free space 101. A second guidepost 104 protrudes from the sidewall 102 substantially parallel to the first guidepost 103. The second guidepost 104 has a diamond-shaped cross-section parallel to the sidewall 102, is tapered towards its free end and is arranged remote from the first guidepost 103. Therefore, the second guidepost 104 is arranged at an end portion of the optical encoder device 100. The first and second guideposts 103, 104 are integrally formed with the optical encoder housing of the optical encoder device 100. It is preferred to produce the optical encoder housing, and, therefore, also the first and second guideposts 103, 104, from a plastically deformable material.

The optical encoder device 100 further comprises connecting pins (not shown) for electrically connecting the optical encoder to the control circuit of the appliance via the PCB. Furthermore, two soldering pins 105, made from a metal, are provided in the optical encoder device 100. The soldering pins 105 are electrically insulated against the optical encoder and protrude from the sidewall 102 substantially parallel to the first guidepost 103. The soldering pins 105 are provided for permanently attaching the optical encoder device 100 to the PCB after positioning the same by means of the first and second guideposts 103, 104. Such a permanent attachment can be carried out during the normal soldering process, where the electrical connections between the connecting pins of the optical encoder and the control circuit of the appliance on the PCB are established. Therefore, the soldering pins 105 together with the soldered connecting pins ensure a permanent attachment of the optical encoder device 100 to the PCB.

The holes in the PCB, which correspond to the first and second guideposts 103, 104, are slightly under-sized, while the first and second guideposts 103, 104 are slightly over-sized. When the first and second guideposts 103, 104 are inserted into the corresponding holes in the PCB, the interfered regions will be scraped off at the edges of the holes in the PCB and the scraped-off material will be displaced. Therefore, channels 106 are provided at the periphery of the first and second guideposts 103, 104 in the sidewall 102. These channels 106 take up the scraped-off material, which is displaced from the interfered regions. Therefore, the channels 106 prevent scraped-off material from becoming wedged between the PCB and the sidewall 102. Thus the channels ensure proper mating of the PCB and the sidewall 102 such that the encoder sits flush on the PCB.

Due to the symmetric design of each of the first and second guideposts 103, 104, the centers thereof are self-aligned with the centers of the corresponding holes in the PCB, thereby reducing tolerance errors during mounting of the optical encoder device 100 onto the PCB. By itself, the first guidepost 103, with its star-shaped cross-section, may not be sufficient to ensure complete rotational fixation of the optical encoder device 100. However, the use of a second guidepost 104, with its diamond-shaped cross-section, serves as a rotational guide while the first guidepost 103 with its star-shaped cross-section serves as the positional guide. Therefore, the first and second guideposts 103, 104 are preferably located at the sidewall 102 underneath the optical encoder, thereby controlling the quality of sensing the codewheel/codestrip.

The first and second guideposts 103, 104 as well as the two soldering pins 105 ensure that the optical encoder device 100 will remain correctly positioned and attached to the PCB, even if the encoder is subjected to external forces.

Figure 5A:
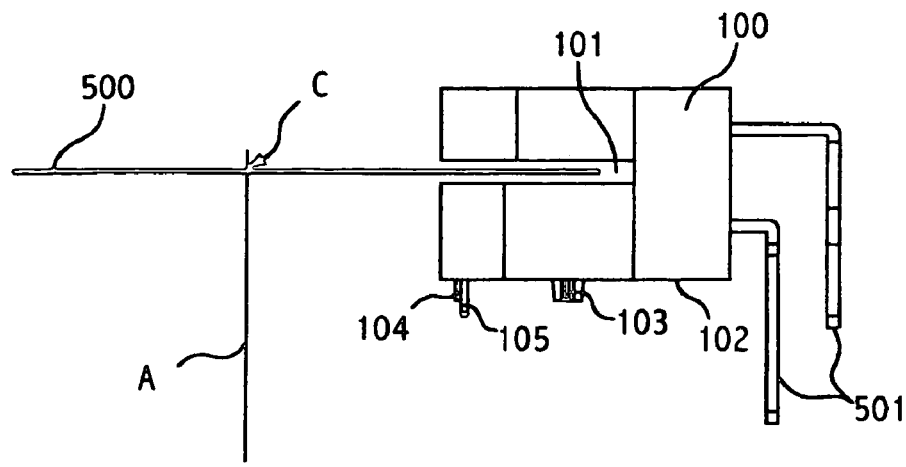
FIGS. 5A and 5B show a side view and a bottom view of the optical encoder device according to said preferred embodiment of the present invention.

FIG. 5A shows a side view of the optical encoder device 100 according to the preferred embodiment of the present invention as well as of a codewheel 500.

The codewheel 500 is arranged such that it is rotatable around a rotational axis A which runs through the center C of the codewheel 500. Further, the codewheel 500 is projected into the free space 101 of the optical encoder device 100. The codewheel 500 is able to change its position by rotating around axis A, while the optical encoder device 100 is permanently attached to the PCB (not shown) and is able to have the motion of the codewheel 500 detected by means of the optical encoder, accommodated in the optical encoder device 100. At the bottom sidewall 102 of the optical encoder device 100, the first and second guideposts 103, 104 as well as one of the two soldering pins 105 are shown. Further, the connecting pins 501, protruding from the optical encoder device 100 at an opposite side relative to the free space 101, are shown. The connecting pins 501 are provided with a 900 offset in direction of the normal line of the sidewall 102 such that an attachment to the PCB by means of soldering is possible.

Figure 5B:
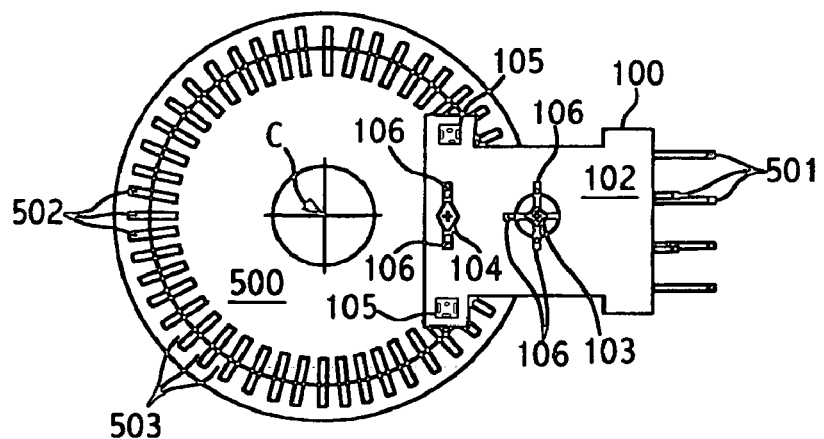

FIG. 5B shows a bottom view of the optical encoder device 100 according to the preferred embodiment of the present invention as well as of the codewheel 500. Parts already known from FIG. 1 or FIG. 5A will not be described again.

The codewheel 500 comprises a regular pattern of slots 502 separated by bars 503. During a rotational motion of the codewheel 500 this regular pattern of slots 502 and bars 503 causes a quadruple or sinusoidal signal to be generated from the optical detector by means of a regular interruption and clearing of the optical path between the optical emitter and the optical detector of the optical encoder.

The channels 106 in the sidewall 102 at the periphery of the first and second guideposts 103, 104 are now also visible in a better way. As already mentioned above, these channels 106 take up the scraped-off material, which is displaced from the interfered regions, where the first and second guideposts 103, 104 interfere with the corresponding holes in the PCB. Therefore, the channels 106 prevent excess material from being lodged between the sidewall 102 and the PCB.

Figure 5C:
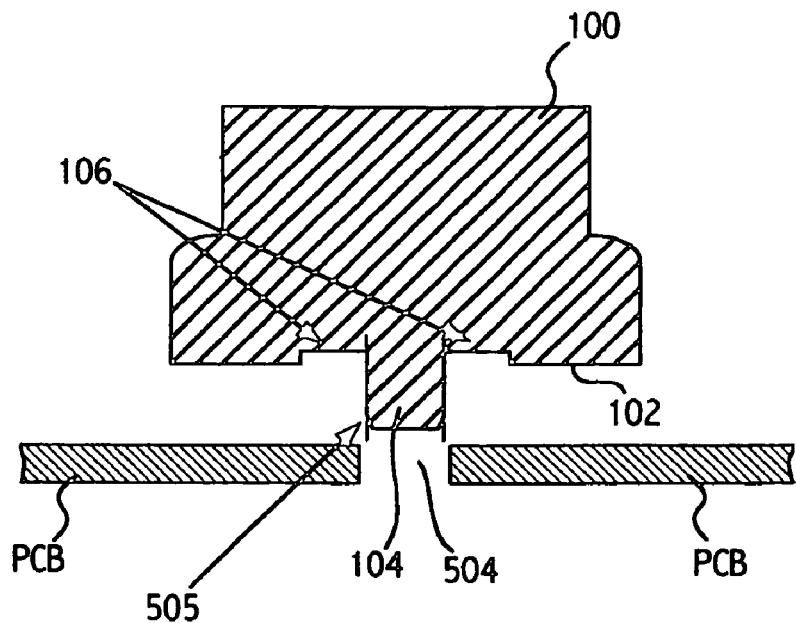
FIGS. 5C and 5D show schematic cross-sections through the optical encoder device according to said preferred embodiment of the present invention at the level of the second guidepost.
Figure 5D:
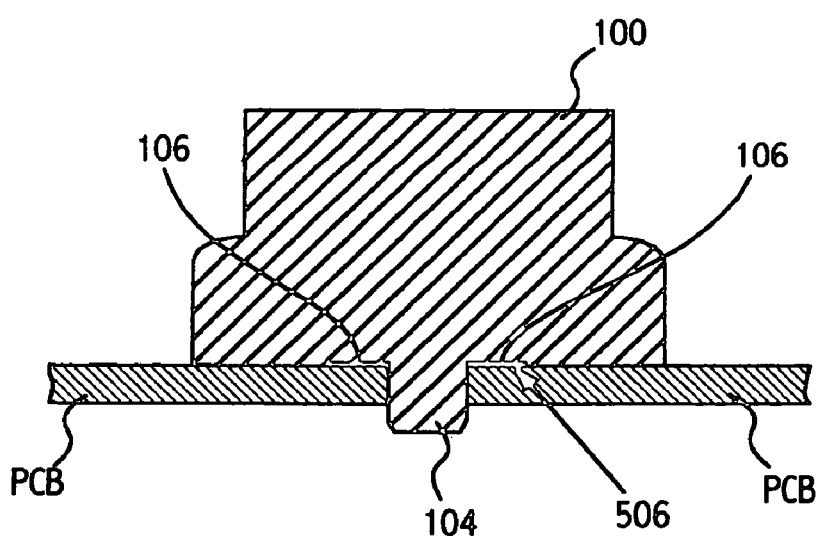

FIG. 5C and FIG. 5D show schematic cross-sections through the optical encoder device 100 according to the preferred embodiment of the present invention at the level of the second guidepost 104. Both figures are only schematic cross-sections for illustrating the displacement of scraped-off material when forcing one of the first and second guideposts 103, 104 into the corresponding holes in the PCB. Therefore, not all parts of the optical encoder device 100 are shown. The effect of displacement of scraped-off material is shown with respect to the second guidepost 104 but is also true for the first guidepost 103.

FIG. 5C shows the optical encoder device 100 prior to the positioning thereof on the PCB. Corresponding to the second guidepost 104 there is a hole 504 provided in the PCB. The hole 504 is slightly under-sized while the second guidepost 104 is slightly over-sized. The material of the slightly over-sized portion of the second guidepost 104 is indicated by reference number 505. It should be noticed that the slightly over-sized second guidepost 104 protruding from the sidewall 102 has a tapered form which runs from the sidewall 102 towards the free end of the second guidepost 104. When the second guidepost 104 is inserted into the corresponding hole 504 in the PCB the interfered regions will be scraped off at the edges and the material 505 will be displaced into the channels 106 as scraped-off material 506.

FIG. 5D shows the optical encoder device 100 after positioning it on the PCB. The difference to FIG. 5C is that the optical encoder device 100 has now direct contact with the PCB. Therefore, the second guidepost 104 is now incorporated in the corresponding hole 504 of the PCB. The channels 106 are partly filled with scraped-off material 506, because they have taken up the scraped-off material 506, which is displaced from the interfered regions as already described above.

What is claimed is:

1. An optical encoder device, comprising:
   an optical encoder to detect codewheel/codestrip positions;
   a housing to accommodate the optical encoder;
   a first tapered guidepost protruding from a sidewall of the optical encoder housing;
   a second tapered guidepost protruding from the sidewall of the optical encoder housing and extending substantially parallel to the first tapered guidepost; and
   at least one channel formed in the sidewall of the housing, wherein each channel is formed at least at a portion of a periphery of one of the first or second tapered guideposts.

2. The optical encoder device of claim 1, wherein:
   the first tapered guidepost is positioned adjacent to the optical encoder; and
   the second tapered guidepost is positioned remote from the optical encoder.

3. The optical encoder device of claim 2, wherein the first tapered guidepost has a star-shaped cross-section.

4. The optical encoder device of claim 3, wherein the second tapered guidepost has a diamond-shaped cross-section.

5. The optical encoder device of claim 2, wherein the first tapered guidepost is positioned at the optical center of the optical encoder.

6. The optical encoder device of claim 2, wherein:
   the housing is substantially C-shaped about a free space;
   the optical encoder comprises an optical emitter and an optical detector that are aligned on opposite sides of the free space; and
   the first tapered guidepost is aligned with both the optical emitter and the optical detector.

7. The optical encoder device of claim 2, further comprising a number of connecting pins that are electrically coupled to the optical encoder; wherein the second tapered guidepost is positioned on a first side of the first tapered guidepost; and wherein the connecting pins extend from the housing on a second side of the first tapered guidepost, opposite the first side of the first tapered guidepost.

8. The optical encoder device of claim 1, further comprising at least one soldering pin protruding from the sidewall of the housing and extending substantially parallel to the first tapered guidepost; wherein the at least one soldering pin is electrically insulated from the optical encoder.

9. The optical encoder device of claim 1, wherein:
   the first and second tapered guideposts are integrally formed with the housing; and
   the housing and first and second tapered guideposts are formed from a plastically deformable material.

10. The optical encoder device of claim 1, wherein each channel extends from a corner of the cross-section of one of the first or second tapered guideposts.

11. The optical encoder device of claim 1, wherein the first tapered guidepost has a star-shaped cross-section and is positioned adjacent to the optical encoder.

12. The optical encoder device of claim 1, wherein:
   the first tapered guidepost is positioned adjacent to the optical encoder; and
   the second tapered guidepost is positioned remote from the optical encoder.

13. The optical encoder device of claim 12, wherein the first tapered guidepost has a star-shaped cross-section.

14. The optical encoder device of claim 13, wherein the second tapered guidepost has a diamond-shaped cross-section.

15. The optical encoder device of claim 12, wherein the first tapered guidepost is positioned at the optical center of the optical encoder.

16. The optical encoder device of claim 12, wherein:
   the housing is substantially C-shaped about a free space;
   the optical encoder comprises an optical emitter and an optical detector that are aligned on opposite sides of the free space; and
   the first tapered guidepost is aligned with both the optical emitter and the optical detector.

17. The optical encoder device of claim 1, further comprising at least one soldering pin protruding from the sidewall of the housing and extending substantially parallel to the first tapered guidepost; wherein the at least one soldering pin is electrically insulated from the optical encoder.

18. The optical encoder device of claim 1, wherein:
   the first and second tapered guideposts are integrally formed with the housing; and
   the housing and first and second tapered guideposts are formed from a plastically deformable material.

19. A system, comprising:
   a printed circuit board having first and second holes therein; and
   an optical encoder device having:
      an optical encoder to detect codewheel/codestrip positions;
      a housing to accommodate the optical encoder;
      a first tapered guidepost protruding from a sidewall of the optical encoder housing; and
      a second tapered guidepost protruding from the sidewall of the optical encoder housing and extending substantially parallel to the first tapered guidepost;
   wherein the first and second tapered guideposts are aligned with and inserted in the first and second holes of the printed circuit board and wherein:
      the optical encoder device further comprises at least one channel formed in the sidewall of the housing;
      each channel is formed at least at a portion of a periphery of one of the first or second tapered guideposts; and
      at least one of the channels contains scrapings that are formed as a result of insertion of the first and second tapered guideposts into the first and second holes of the printed circuit board.

* * * * *